Figures 1, 2:
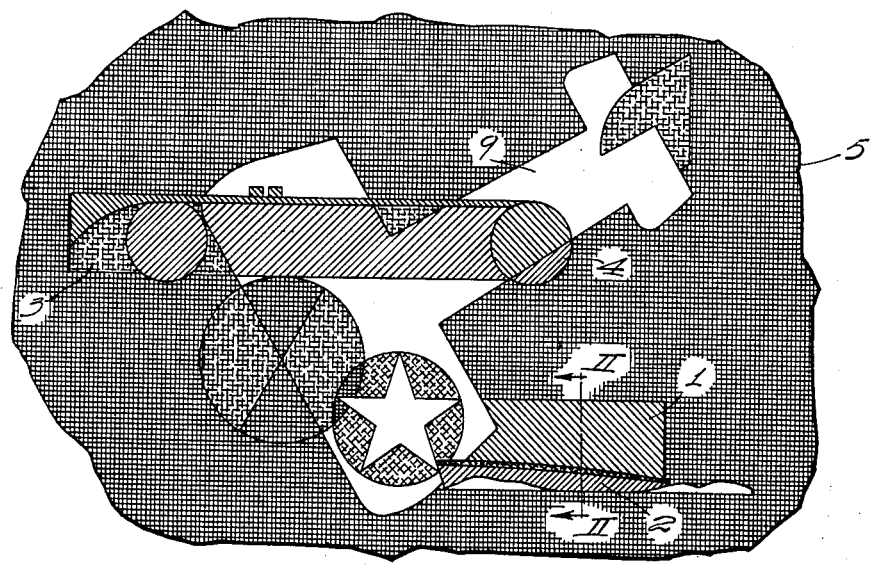

Jan. 9, 1934.     L. O. MARSTELLER     1,943,131
MOLDED DECORATIVE ARTICLE
Filed Jan. 25, 1933

WITNESSES:

INVENTOR
Lester O. Marsteller
BY Howard Flint
ATTORNEY

Patented Jan. 9, 1934

1,943,131

UNITED STATES PATENT OFFICE 1,943,131

MOLDED DECORATIVE ARTICLE

Lester O. Marsteller, Wilkinsburg, Pa., assignor to Westinghouse Electric & Manufacturing Company, East Pittsburgh, Pa., a corporation of Pennsylvania Application January 25, 1933. Serial No. 653,552

7 Claims. (Cl. 41—35)

This invention relates to decorative surfaces molded into plastic compositions.

It has become common practice to mold various synthetic plastics of organic nature, such as those chemically condensed from phenols, carbohydrates, urea, organic acids, vinyl compounds, those of cellulose esters and ethers, or many other bases. Some of these are amenable to cold molding; other require high temperature combined with pressures of several hundred pounds per square inch. This invention is applicable broadly to such products, but it is illustrated sufficiently by reference to articles molded of thermosetting resin such as those molded from paper sheets containing phenolic or urea type resin.

In molding articles of decorative appearance, two major difficulties have elicited numerous suggestions for improvement. One problem has been to utilize colors in extensive variety and value; another, to mold decorative sheets to a plastic body with satisfactory adhesion. Thus, desirable mechanism is sought to extend the scope of choice of appearance in combination with relative permanence.

Particularly, it is desirable to extend these improvements in molding decorative surfaces so as to exhibit metallic lustre combined with the effect of depth. It is desirable to avoid a mirror polish, and avoid also a tarnished appearance. It is desirable to obtain the lustre with softness and sheen. When a surface is highly reflecting, it masks or destroys color values, and similarly when metal tarnishes, its initial hues are altered; thus permanent matching or duplication of color is rendered impossible. These changes ordinarily are accelerated by conditions of molding such as temperature or solvent or pressure. Thermal effects and penetrating liquids or gases tend to alter the chroma of dyes and even of some pigments or tend to cause fading and "running" or streaking.

It is an object of this invention to mold plastic decorative articles so that with a considerable degree of permanence they will exhibit metallic lustre combined with the effect of depth. It is an object further to mold plastic surfaces in various selections of hue combined with an appearance of depth and metallic lustre.

Other objects are to provide a process of molding plastics to display metallic lustre in considerable variety of color, in a manner that admits of duplicating or matching desired hues, as well as of introducing contrast substantially at will.

Another object is to mold plastic articles having the appearance described so that they exhibit sharply defined margins between colors or between an area of such appearance and an adjacent surface of the plastic base.

Another object is to avoid streakiness or uneven color distribution on molding.

A further object of paramount importance is to mold such lustrous surfaces with a high degree of strength and adherence, and resistance to checking or "crazing", and resistance to wear.

Other objects will appear from the following description and in the accompanying drawing, illustrative of preferred embodiments of this invention.

This invention is predicated on my discovery that these and other objects may be accomplished, and plastic articles made to exhibit metallic lustre with permanence and variety of hue, by molding with the plastic a particular combination of aluminum and aluminum oxide known to the art as anodic aluminum.

Anodic aluminum has been described as a product obtained by treatment of aluminum, or aluminum base metals, with corrosive solutions, and more particularly by treatment thereof as an anode in electrolytes of alkaline or of acid nature. U. S. Patent 1,869,058, Gower, describes anodizing aluminum in dilute sulfuric acid; and various other processes are known. Research indicates that anodic aluminum presents one or more oxidized coatings of microscopic thickness and that this may be amorphous or be crystalline, and may or may not contain either adsorbed water or water of composition. The film is adherent to the underlying metal and is relatively hard. Since this material is known of itself, it is referred to in this description and in the claims simply as anodic aluminum.

Referring more particularly to the drawing,

Figure 1 shows in plan view a decorative molded surface illustrative of this invention in obtaining artistic effects. This view may be regarded as a surface from a molded serving tray or from a decorative wall panel, exhibiting relatively permanent metallic lustre in various hues and with sharply defined contrasts. Various decorative elements 1, 2, 3, 4 of this assembly include composites of anodic aluminum and colorant molded into unitary structure with plastic 5, while element 9 exhibits the lustre of anodic aluminum alone.

Fig. 2 is a magnified cross-section of this surface structure taken along the line II—II of Fig. 1. In this view is shown a decorative layer having underlying metal structure 6 and microscopic surface films 8 and 1, 2 or 7. These films, according to present understanding, comprise a network structure of tiny capillaries, the wall surfaces of which appear capable of being "wet" by plastic under conditions of molding, or at least of becoming united with plastic or plastic and fibre 5 in a strongly adherent and substantially unitary combination with the anodized film. Upper films 1, 2 and 7 are similar to 8, but are designated separately in the present illustration in order to emphasize molded combinations of anodic aluminum film with colorant to exhibit metallic lustre combined with depth of appearance. Also they emphasize the sharply defined margins that are attainable.

According to present preferred practice of this invention, a conventional plastic composition is arranged for molding, as by superposing several sheets of paper impregnated with uncured resin of phenolic or urea type. To the surface is applied anodic aluminum in any desired arrangement, and embodying colorant if desired. To prevent displacement, a heated object may be applied lightly to the metal. The thermosetting resins appear to undergo sufficient preliminary polymerization at the heated points to anchor the metal securely for subsequent processing.

The object thus prepared is subjected to pressure of about 800 to 3000 pounds per square inch. At the same time, the temperature is increased to about 200° C. for phenolic resins or to about 125°–150° C. for urea resins. Under these conditions, these resins first soften and flow and then with chemical change harden to form a unitary structure. Despite the stress of heat and pressure, the outer film of anodized aluminum maintains its uniformity and freedom from cracking or checking. Molding conditions appear to effect no further reaction nor impairment of the metallic appearance and the depth of lustre transmitted by the oxidized surface. The surface does not become chalky, nor "bloom", nor mask the particular hue of the uncured surface. Escape from the plastic of organic substances that are solvents for dyes does not cause diffusion of dye from the anodized aluminum. Thus, the finished surface is free from streakiness of color and it becomes feasible to mold artistic designs that involve sharp lines of demarcation.

Not only do the anodized aluminum films possess sufficient hardness and strength to resist crushing and blurring or flaking under tremendous pressure in molding, but they appear to effect a particularly strong bond with the plastic. Under high pressures of molding, the plastic is relatively fluid, especially at the elevated temperatures of molding thermosetting resins. In the interim before the plastic sets, displacement and flow in the decorative areas appear to be counteracted in some manner. Present belief is that, with thermosetting resins at least, this excellent anchorage is due in part to advanced polymerization of resin at the previously heated anchorage points, so that resin under the film has begun to set while the main body of matrix is yet fluid. In any event, and whether solvent displacement is accompanied by polymerization or not, the exceptionally high heat conductivity and specific heat of the film appears to accelerate polymerization, evolution of solvent and bonding in the molded plastic under the decorative area of anodized aluminum. Thus, the high strength and resistance to crushing or crumbling, the physical characteristics of anodized aluminum on heating and the chemical nature of the film all appear to contribute to the ultimate success of this particular decorative process of this invention.

In this description and claims, the term "color" or "colorant" is intended to include organic dyestuffs, and include also various colloidal pigments, in combination with the anodized aluminum film. Such colors may include black as well as white. Also the term is intended to include the natural hue of anodized aluminum, since certain benefits of this invention are derived from the anodized film even in the absence of added colorant.

It is intended that, within the limitations of the prior art, this invention be construed broadly to the combination of plastic with anodic aluminum, and not restricted to the particular example of strip material nor to any considerable metal core. Further, benefits of this invention may be realized with the anodic aluminum in a sub-surface of the plastic article.

In the description and claims, the term "molded" as applied to plastics is intended to convey its usual meaning in the art; namely, the union or integration that occurs on subjecting the material to heat and/or pressure. This usually involves the colloidal changes that occur with the removal of solvent or dispersion fluid under pressure or heat and pressure, and with thermosetting resins involves also such chemical polymerization or condensation as may occur.

According to the provisions of the patent statutes, I have explained the principle and mode of operation of my invention, and have illustrated and described what I now consider to represent its best embodiment. However, I desire to have it understood that within the scope of the appended claims, the invention may be practiced otherwise than as specifically illustrated and described.

I claim as my invention:

1. An article comprising a base of plastic composition molded with colorant and exhibiting metallic lustre with depth and relative permanence, said colorant comprising anodic aluminum.

2. An article comprising a base of thermosetting plastic molded with colorant and exhibiting metallic lustre with depth and relative permanence, said colorant comprising anodic aluminum.

3. An article comprising thermosetting plastic having molded therewith a composite of anodic aluminum and organic dyestuff to form a substantially unitary structure with the base.

4. An article comprising thermosetting plastic having a substantially unitary molded surface that exhibits anodic aluminum in combination with organic dyestuff.

5. An article comprising a base of thermosetting plastic having molded into its surface anodic aluminum exhibiting color in metallic lustre along a sharply defined margin.

6. An article comprising thermosetting plastic having a molded surface comprising anodic aluminum and organic dye exhibiting color with metallic lustre along a sharply defined margin within the surface.

7. An article having a molded surface comprising in distinct areas anodic aluminum, phenolic resin and aluminum in combination with organic dye to exhibit color with metallic lustre, said lustrous area being substantially integrally united to the molded phenolic resin.

LESTER O. MARSTELLER.